United States Patent [19]
Aoki

[11] 3,914,081
[45] Oct. 21, 1975

[54] APPARATUS FOR INJECTION MOLDING TWO-COLORED PRODUCTS

[76] Inventor: Katashi Aoki, 6037, Oaza Minamijo, Sakaki, Hanishina, Nagano, Japan

[22] Filed: Dec. 7, 1972

[21] Appl. No.: 312,991

Related U.S. Application Data

[62] Division of Ser. No. 100,604, Dec. 22, 1970, abandoned.

[30] Foreign Application Priority Data
Dec. 29, 1969  Japan.............................. 44-105181

[52] U.S. Cl................................ 425/130; 425/246
[51] Int. Cl.².......................... B29C 9/00; B29F 1/12
[58] Field of Search ........... 425/117, 120, 121, 126, 425/129, 242 R, 242 B, 247, 246, 248, 249, 130; 264/246, 247, 248, 255, 334

[56] References Cited
UNITED STATES PATENTS
| | | | |
|---|---|---|---|
| 2,333,059 | 10/1943 | Tucker............................ | 264/247 X |
| 2,479,383 | 8/1949 | MacMillin...................... | 425/248 X |
| 3,482,284 | 12/1969 | Rees................................. | 425/130 |
| 3,702,750 | 11/1972 | Veneria........................... | 425/130 |

*Primary Examiner*—Francis S. Husar
*Assistant Examiner*—John S. Brown
*Attorney, Agent, or Firm*—David H. Semmes

[57] ABSTRACT

Employing an injection molding apparatus having two sets of metal molds and a freely reciprocable and rotatable stripper plate for supporting molded products between the male and the female mold-halves of said two sets of metal molds, two-colored molded products are injection-molded in accordance with a process comprising the steps of injecting a material of a first color into the first metal mold so that a primary product is obtained therein, removing the primary product from the first metal mold with the product supported on the stripper plate, rotating the stripper plate for shifting the primary product into the second metal mold on said stripper plate, closing the second metal mold, and injecting a material of second color into said second metal mold.

3 Claims, 6 Drawing Figures

INVENTOR
KATASHI AOKI

BY *[signature]*
ATTORNEY

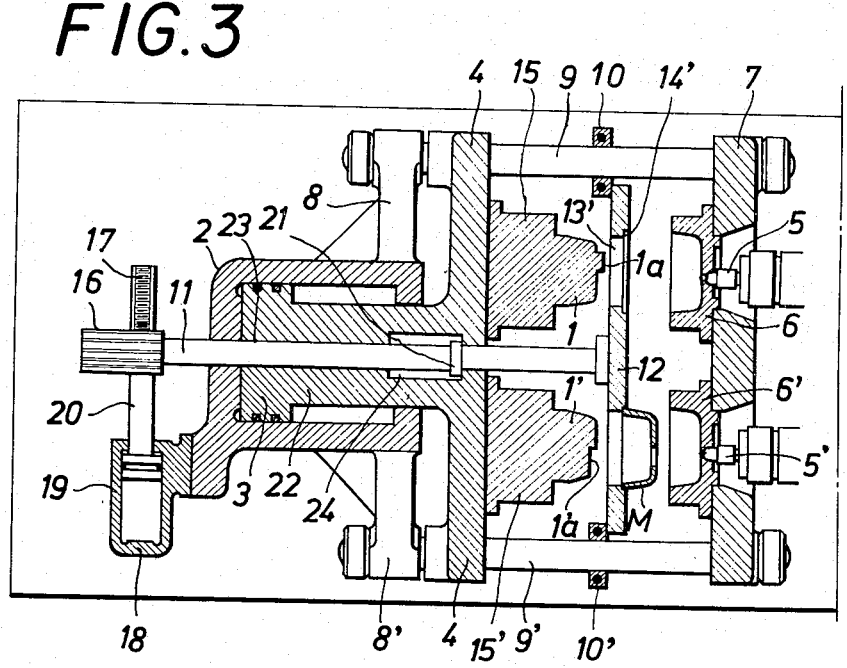
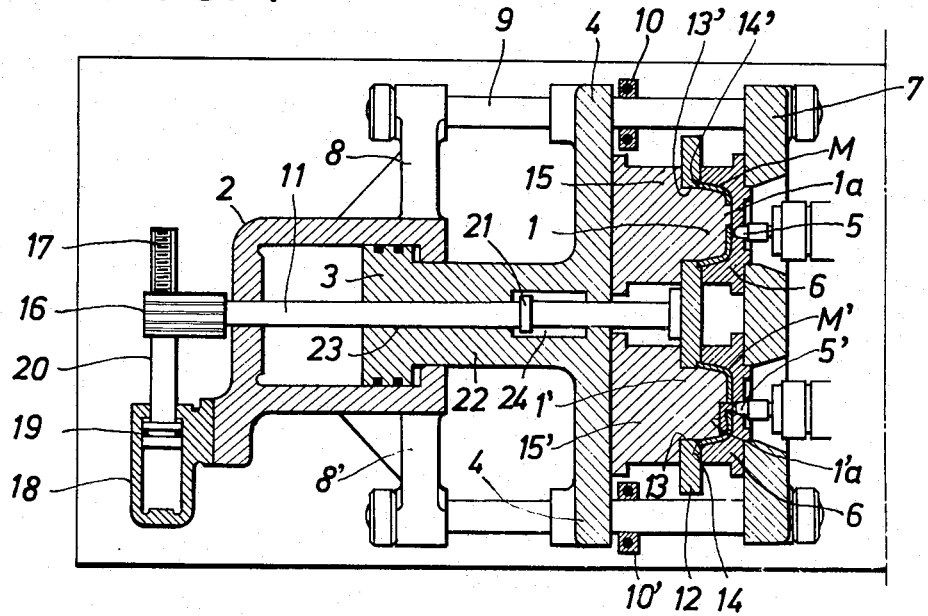

INVENTOR
KATASHI AOKI

BY *David H. Semmes*

ATTORNEY

APPARATUS FOR INJECTION MOLDING TWO-COLORED PRODUCTS

This is a division of application Ser. No. 100,604, filed Dec. 22, 1970, now abandoned.

BACKGROUND OF THE INVENTION

This invention relates to an injection molding process for producing two-colored molded products, and more particularly to a process in which a primary product injection-molded in a first metal mold is thereafter shifted to a second metal mold under the operation of a stripper plate and in the second metal mold, the primary molded product is further injection-molded employing a material having different color.

Heretofore, such a process has been so organized that the primary molded product injection-molded in a first metal mold is shifted on a projecting (or male) half of the first metal mold to the second metal mold and inserted into the concaved (or female) half of the second metal mold to be subjected to an additional injection molding process employing a material having a different color. However, in that case, the first and the second metal molds should be of such a type wherein the female halves of the first and the second molds can be operated with one male mold-half commonly, whereby the freedom of selecting different male mold-halves for the first and the second metal molds is totally lost, and the additional formation of a part having a different color on the priimary product has also been highly limited.

SUMMARY OF THE INVENTION

Therefore, a primary object of the present invention is to provide an improved injection molding process wherein different male mold-halves can be employed in the first and the second metal molds.

Another object of the present invention is to provide an improved two-color injection molding process wherein the freedom of selecting the additionally molded part having a different color color formed on the primarily molded product can be much expanded.

Still another object of the invention is to provide an improved two-color injection molding process wherein the necessity of rotating the male mold-half is eliminated and the construction of the injection molding device is much simplified.

An additional object of the invention is to provide an improved two-color injection molding process wherein the necessity of mating the commonly employed male mold-half with the two female mold-halves is eliminated and the formation of the metal molds is much simplified.

The above described and other objects of the invention can be achieved by an improved process for producing two-colored injection molding products, wherein at least a first and a second metal molds are provided and a stripper plate supporting the molded products formed between the male mold-halves and female mmold-halves of the first and the second metal molds and freely reciprocable in the axial direction is freely rotatably interposed between the male mold-halves and the female mold-halves, whereby a primary product molded in the first metal mold is, after it is removed from the first metal mold, shifted on the stripper plate to the second metal mold, and, after the second metal mold is closed including the primary product therin, a meterial having a different color is injected into the second mold so that a product having two-colored portions are thereby obtained.

The nature, principle, and utility of the invention will be better understood from the following detailed description of the invention when read together with the accompanying drawings.

BRIEF DESCRIPTION OF THE DRAWINGS

In the drawings:

FIG. 3. is a longitudinal sectional view of the same device in a condition wherein a stripper plate is rotated by a half turn from the condition shown in FIG. 2;

FIG. 4 is a longitudinal sectional view of the same example of the device wherein a molding is carried out in a condition shown in FIG. 3;

DETAILED DESCRIPTION OF THE INVENTION

Figure 1:
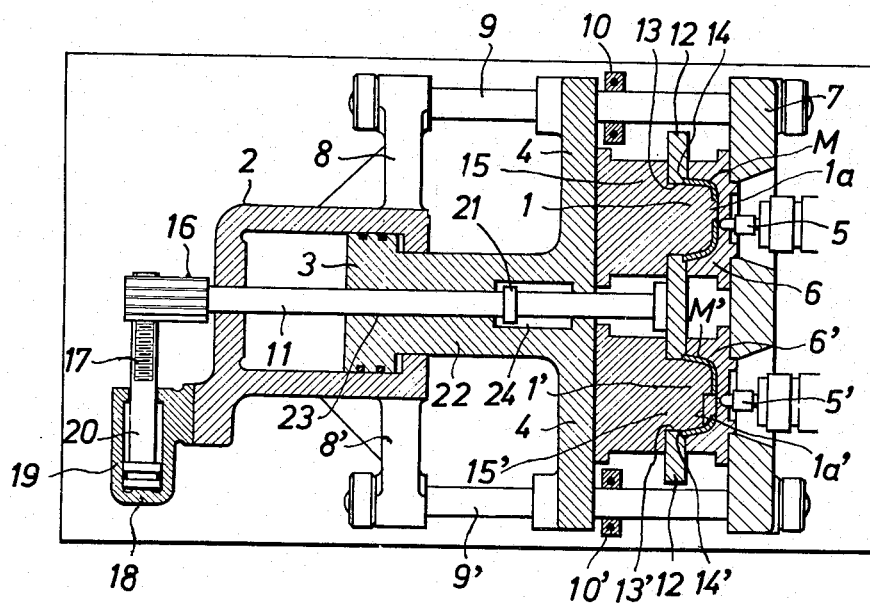
FIG. 1 is a longitudinal sectional view of a two-color injection molding device for practicing the process according to the present invention.

Referring now to FIGS. 1 through 4, there is indicated an example of the two-color injection molding device for practicing the present invention, wherein male mold-halves 1, 1' are attached to a supporting plate 4 formed integrally with a piston 3 provided inside of a hydraulic cylinder 2. Opposingly facing the male mold-halves 1, 1' , female mold-halves 6, 6' attached with the respective injection nozzles 5, 5' are mounted on a fixed plate 7. As is apparent from the drawing, the male mold-halves 1, 1' include different shaped portion la, la' therein.

Between supportin arms 8, 8' projected from the hydraulic cylinder 2 and the fixed plate 7, tie-bars 9, 9; are extended, and on the tie-bars 9, 9' , the above mentioned supporting plate 4 is loosely mounted so that the male mold-halves 1, 1' supported on the supporting plate 4 may be shifted toward the female mold-halves 6, 6' along the tie-bars 9, 9' until the supporting plate 4 abuts stoppers 10, 10' fixed on the tie-bars 9, 9' .

Between the male mold-halves 1, 1' and the female moldhaves 6, 6' , there is located a stripper plate 12 attached on the tip of a shaft 11 penetrating the piston 3 and the supporting plate 4. Through the stripper plate 12, through holes 13, 13' for receiving male mold-halves are provided, and around the through holes 13, 13' , molded products holding seats 14, 14' are formed concentrically. The stripper plate 12, is pushed by the expanded base portions of the male mold-halves 1, 1' in the molds closing step of the operation, and the seats 14, 14' are brought to contact the female mold-halves 6, 6' , and the molds thus closed are injected by materials having different colors.

On the other end of the shaft 11 for the stripper plate 12, a gear wheel 16 having an elongated thickness is fixed, and a rack 17 engaging the gear wheel 16 is formed on a piston rod 20 connected to a piston 19 received in a hydraulic cylinder 18, whereby the stripper plate 12 is rotated by a half turn when the gear wheel 16 of an elongated thickness is driven by the rack 17 and a piston 19 moved vertically in the hydraulic cylinder 18. The shaft 11 is further provided with a flange 21 received in an expanded hole 24 formed as a part of a shaft guiding hole 23 bored through the piston supporting plate 4, and an intermediately provided coupling body 22, whereby the shaft 11 can be moved reciprocally through a distance determined by the axial length of the expanded hole 24.

The injection molding device as described above can operate as follows. In an operational condition shown in FIG. 1, the male mold-halves 1, 1' engage respectively the female mold-halves 6, 6', and a melted synthetic resin is injected from the injection nozzles 5, 5' into the cavities inside of the metal molds. At this time, an injection mold of different color resin is carried out in the male mold-half 1' and the female mold-half 6' as described hereinlater.

Figure 2:
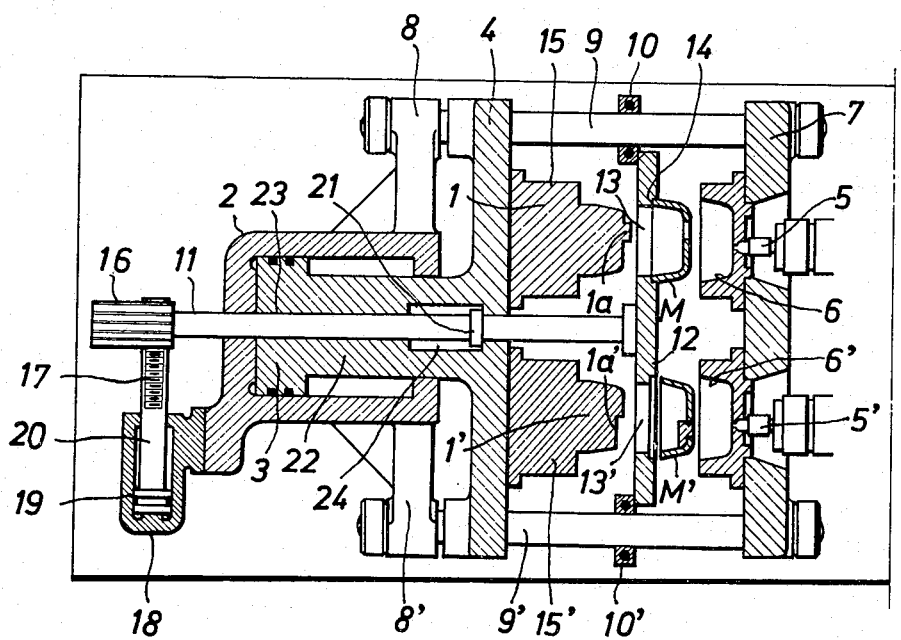
FIG. 2 is a longitudinal sectional view of the same device in a condition wherein a molded product is about to be delivered.

A molded product in the first male mold-half 1 and the female mold-half 6 and having a color is retracted together with the male mold-half 1 and the stripper plate 12 from the female mold-half 6 as shown in FIG. 2, and the stripper plate 12 is stopped by the stopper 10, 10' mounted on the tie-bars so that only the male mold-half 1 further retracts and the molded products M, M' are left on the stripper plate 12. By this way, the products M,M' are completely removed from the metal molds. Since the molded product M' has completed the two-colored molding processes as will be described later, it is dropped from the stripper plate 12, and the first molded product M which has finished its one-colored molding process is left on the holding seat of the stripper plate.

At this state, the hydraulic piston 19 is operated and the shaft 11 of the stripper plate 12 is rotated for a half turn by means of the rack 17 and the gear wheel 16 of elongated thickness. As a result, the molded product M finished its first step of the injection molding processes is shifted its position to that of the second metal mold. That is, the primary product M is now brought into the position between the male mold-half 1' and the female mold-half 6' (see FIG. 3), and the supporting plate 4 is advanced toward the female mold-halves.

As a result, the primary product M is inserted into the female mold-half 6' of the second mold by means of the male mold-half 1' of also the second mold and mounted on the supporting plate 4 until the second metal mold is thereby firmly closed. Then, a synthetic resin having a second color is injected through the injecting nozzle 5' to a cavity formed by the male mold-half 1' having a portion formed into a different shape as indicated by 1' a than the shape 1a formed on the male mold-half 1 of the first metal mold and the femal mold-half 6' of the second metal mold, in which cavity the primary product M is inserted as described above, and the molded product M' having two-colored portions is obtained. During the period, between the male mold-half 1 and the female mold-half 6 of the first metal mold, the first molded product M is simultaneously produced (see FIG. 4). The stripper plate and the supporting plate 4 are thereafter retracted, and the thus formed two-color molded product M' is dropped out. When the above described operation of the injection mold is repeated, two-colored products can be continuously obtained from the single injection molding apparatus.

Figure 5:
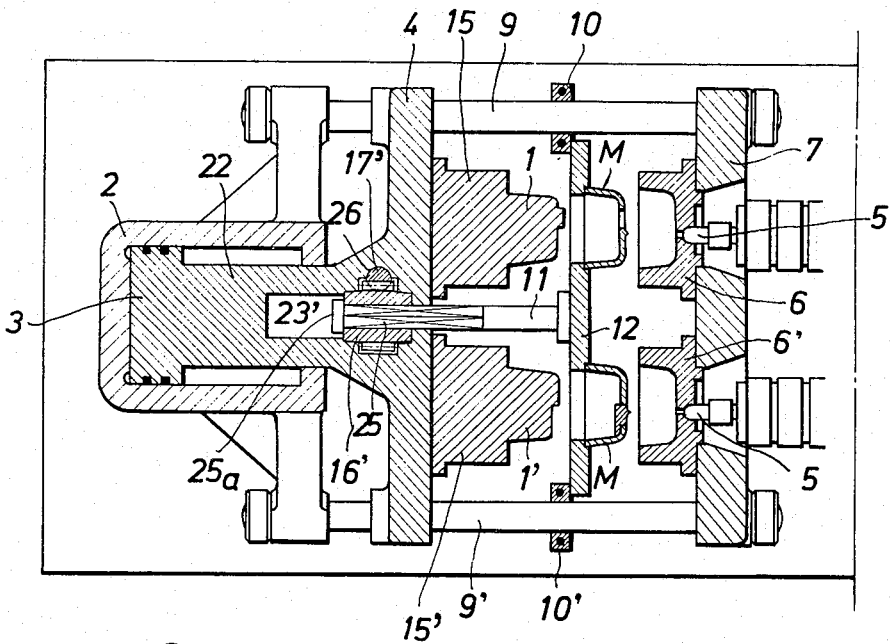
FIG. 5 is a longitudinal sectional view of another example of the device wherein a molded producted is just delivered from a metal mold.
Figure 6:
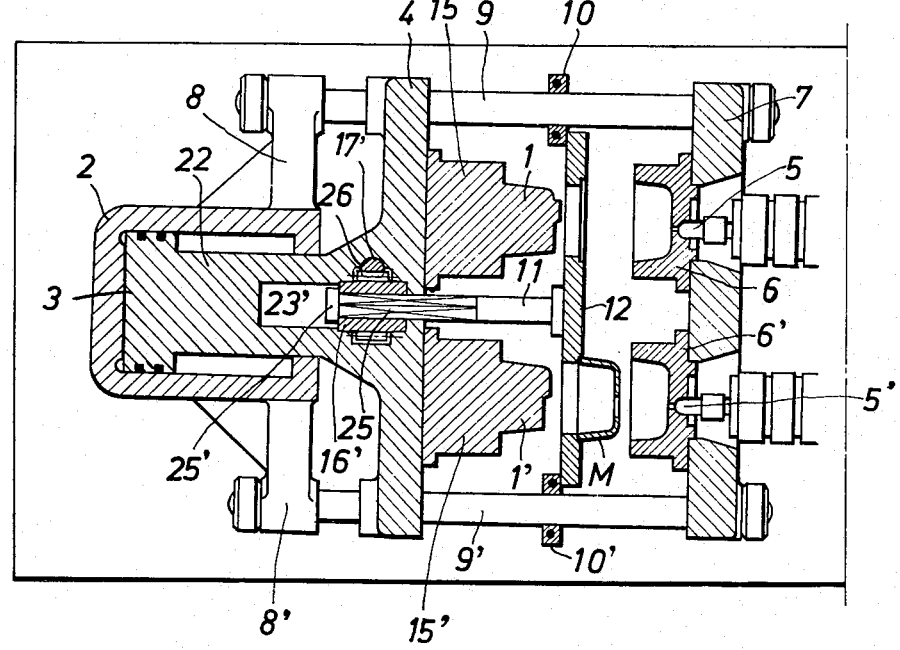
FIG. 6 is a longitudinal sectional view of the another example of the device wherein the stripper plate is rotated by a half turn.

In the second example of the injection molding apparatus as shown in FIGS. 5 and 6, a shorter shaft hole 23' not reaching to the piston 3 is bored through the supporting plate 4 and the interconnecting portion 22, and a shaft 11 of a shorter length and connected to the stripper plate 12 is inserted through the hole 23'. One part 25 of the shaft 11 is formed into a square crosssectional configuration, and a gear wheel 16' is a slidably mounted on this part of the shaft. At an end of the square portion 25 of the shaft 11, a stopper flange 25' is provided for preventing the gear wheel 16' being slid off the shaft 11. Furthermore, another hole 26 extending laterally is bored through the connecting portion 22 intermediate between the supporting plate 4 and the piston 3, and a rack 17' is inserted through the lateral hole 26. Although the detailed construction is not shown in FIGS. 5 and 6, the rack 17' is driven by a hydraulic piston and cylinder as shown in the previous example of the apparatus, and the shaft 11 is rotated for 180° when the rack is moved laterally by the hydraulic device. It should be noted that the hydraulic device is not operated when the stripper plate 12 is moved forwardly or backwardly. Other construction of this example of the injection molding apparatus is quite same as the previous example, and the detailed description thereof is omitted for the simplification of the description. Furthermore, the differently configured portion may also be provided on the internal surface of the female mold-half 6' as well as on the male mold-half such as 1' a described before. Of course, the two-color injection molding operation can be exercised even where the two male mold-halves 1 and 1' are made quite equal.

Since the invention is so organized that the primary product having one-color molded in the first metal mold is once removed from the metal mold, and after the primary product is released from the male mold-half 1, the product is transported to the second metal mold on the stripper plate to be further injection molded with a different color, the two male mold-halves are not necesssarily limited to have the same surface configuration, but they may be shaped differently as described above.

Therefore, not only the two-colored molded products, which can be obtained in the conventional process, may also be produced according to the present invention, but the products having partial configurations such as characters or figures of a different color, which have been considered impossible to be produced, may also be obtained by the employment of suitable configurations for the male mold-halves. Furthermore, since there is no necessity of rotating the metal molds, the construction of the injection molding apparatus can be simplified, and because of the realization of the accurate mold closure, damages of the metal molds may also be substantially reduced.

I claim:

1. An injection molding appartus for injection molding two-colored products comprising:
    A. two spaced sets of molds including coactive male and female mold-halves, said mold-halves being reciprocably movable with respect to one another to open and closed positions;
    B. a stripper plate movably positioned intermediate the mold-halves;
    C. means for reciprocating and rotating said stripper plate to successively remove a primary molded product from the mold-halves of a first mold set, rotate said stripper plate to juxtapose a primary molded product with a second said mold set and position the primary mold product in the second said mold set; and D. means for injecting molding material separately into said mold sets.

2. Injection molding apparatus as claimed in claim 1 wherein the first and second mold sets are of diifferent design configurations and wherein the molding materials injected into the first and second sets are of different colors, different colored material injected into the second said mold set integrating with a primary molded product from the first mold set to a composite two-colored molded product.

3. Injection molding apparatus as claimed in claim 2 including means slidably mounting the mold-halves of the mold sets with respect to the other halves thereof, a shaft reciprocably and rotatably mounting said stripper plate intermediate the mold-halves, stop means defining the limits of movement of the slidable mold-half and the stripper plate to relatively spaced positions of the mold-halves and stipper plate intermediate thereof to permit the rotation of said stripper plate for subsequent placement of the primary molded product in the second of the mold sets.

* * * * *